US009599139B2

(12) United States Patent
Sauer

(10) Patent No.: US 9,599,139 B2
(45) Date of Patent: Mar. 21, 2017

(54) ASSEMBLING OF DRAWER

(76) Inventor: Steen Sauer, Frederiksberg C (DK)

(*) Notice: Subject to any disclaimer, the term of this patent is extended or adjusted under 35 U.S.C. 154(b) by 287 days.

(21) Appl. No.: 14/119,804

(22) PCT Filed: May 24, 2012

(86) PCT No.: PCT/EP2012/059684
§ 371 (c)(1),
(2), (4) Date: Jun. 11, 2014

(87) PCT Pub. No.: WO2012/160129
PCT Pub. Date: Nov. 29, 2012

(65) Prior Publication Data
US 2014/0286701 A1 Sep. 25, 2014

(30) Foreign Application Priority Data
May 25, 2011 (EP) .................................. 11167510

(51) Int. Cl.
*B23P 11/02* (2006.01)
*B23P 19/02* (2006.01)
(Continued)

(52) U.S. Cl.
CPC .......... *F16B 12/46* (2013.01); *A47B 88/0014* (2013.01); *F16B 12/125* (2013.01);
(Continued)

(58) Field of Classification Search
CPC .. F16B 12/46; F16B 12/125; F16B 2012/466; F16B 12/44; F16B 2012/443;
(Continued)

(56) References Cited

U.S. PATENT DOCUMENTS 1,468,786 A     9/1923  Knechtel
2,495,966 A  *  1/1950  Haines ...................... E04B 1/26
                                                              403/169

(Continued)

OTHER PUBLICATIONS

International Search Report on corresponding PCT application (PCT/EP2012/059684) from International Searching Authority (EPO) dated Nov. 12, 2012.

*Primary Examiner* — Sarang Afzali
*Assistant Examiner* — Darrell C Ford
(74) *Attorney, Agent, or Firm* — Klein, O'Neill & Singh, LLP

(57) ABSTRACT

A method of assembling first and second furniture elements, the first furniture element including a groove defined between first and second opposed side surfaces, the second furniture element including a tongue defining first and second opposed tongue surfaces, wherein the method includes (a) inserting the tongue into the groove so as to establish contact between the second tongue surface and the second side surface, the first side surface and the first tongue surface thereby defining an elongated compartment; (b) providing a furniture locking element having (i) an elastic base portion having first and second side walls forming a trough; and (ii) a stiff insertion portion configured for insertion into the trough; (c) inserting the base portion into the elongated compartment, forcing the second tongue surface toward the second side surface; and (d) inserting the insertion portion into the trough, forcing the first and second side walls away from each other.

5 Claims, 7 Drawing Sheets

(51) Int. Cl.
*F16B 7/04* (2006.01)
*F16B 12/46* (2006.01)
*A47B 88/00* (2017.01)
*F16B 12/12* (2006.01)

(52) U.S. Cl.
CPC ... *F16B 2012/466* (2013.01); *Y10T 29/49826* (2015.01); *Y10T 403/7073* (2015.01)

(58) Field of Classification Search
CPC .......... F16B 2012/145; A47B 88/0014; A47B 47/0033; Y10T 403/7073; Y10T 29/49826; Y10T 29/49945; Y10T 29/49876; Y10T 403/7094; Y10T 403/7096; Y10T 403/4602; Y10T 403/73
USPC .......................................... 29/428, 453, 525
See application file for complete search history.

(56) References Cited

U.S. PATENT DOCUMENTS

| | | | | |
|---|---|---|---|---|
| 3,664,011 A * | 5/1972 | Labastrou | ................. | B27F 1/00 144/347 |
| 4,300,851 A * | 11/1981 | Thelander | ............ | A47B 13/021 248/188 |
| 5,743,047 A * | 4/1998 | Bonne | ..................... | B60J 10/00 49/441 |
| 5,803,561 A * | 9/1998 | Puehlhorn | ............. | F16B 12/125 312/263 |
| 5,809,707 A * | 9/1998 | Bargados | ................... | B60J 1/10 296/146.15 |
| 6,045,290 A * | 4/2000 | Nocievski | ............. | F16B 12/125 403/230 |
| 6,691,537 B2 * | 2/2004 | Tan | ..................... | B63B 35/7933 403/315 |
| 7,980,039 B2 * | 7/2011 | Groeke | ................... | E04F 15/02 403/350 |
| 8,381,476 B2 * | 2/2013 | Hannig | ................... | E04F 15/02 428/50 |
| 8,621,814 B2 * | 1/2014 | Cappelle | ................ | E04F 15/02 52/582.1 |
| 2003/0056449 A1 * | 3/2003 | Geiger | .................... | B60J 1/002 52/204.53 |
| 2004/0253051 A1 * | 12/2004 | Napp | ..................... | F16B 5/002 403/331 |
| 2005/0098556 A1 * | 5/2005 | Kellerer | ............. | B65D 11/1833 220/7 |
| 2007/0006543 A1 * | 1/2007 | Engstrom | ............... | E04F 15/02 52/582.1 |
| 2008/0283448 A1 * | 11/2008 | Bacho | ...................... | B07B 1/46 209/392 |
| 2015/0078819 A1 * | 3/2015 | Derelov | ................. | F16B 12/46 403/375 |

\* cited by examiner

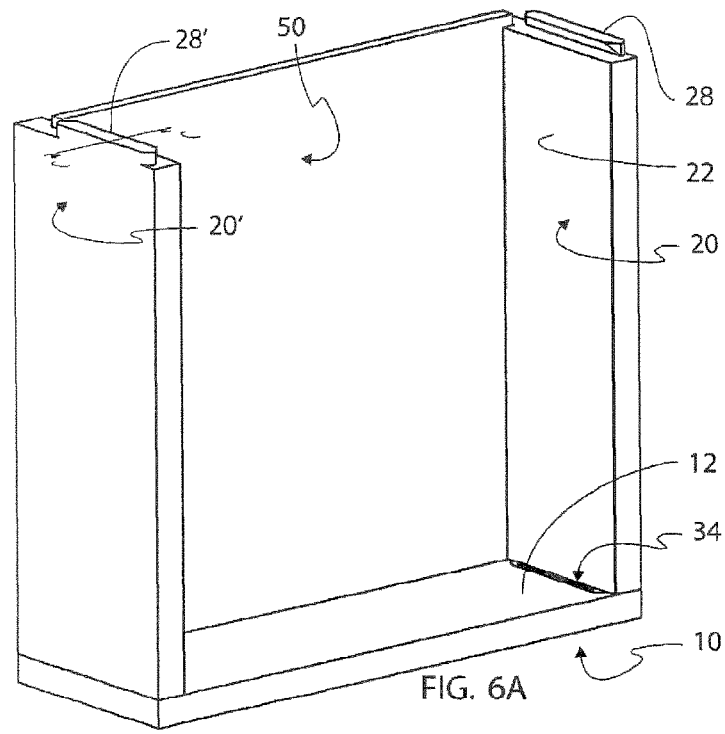
FIG. 6A
FIG. 6B
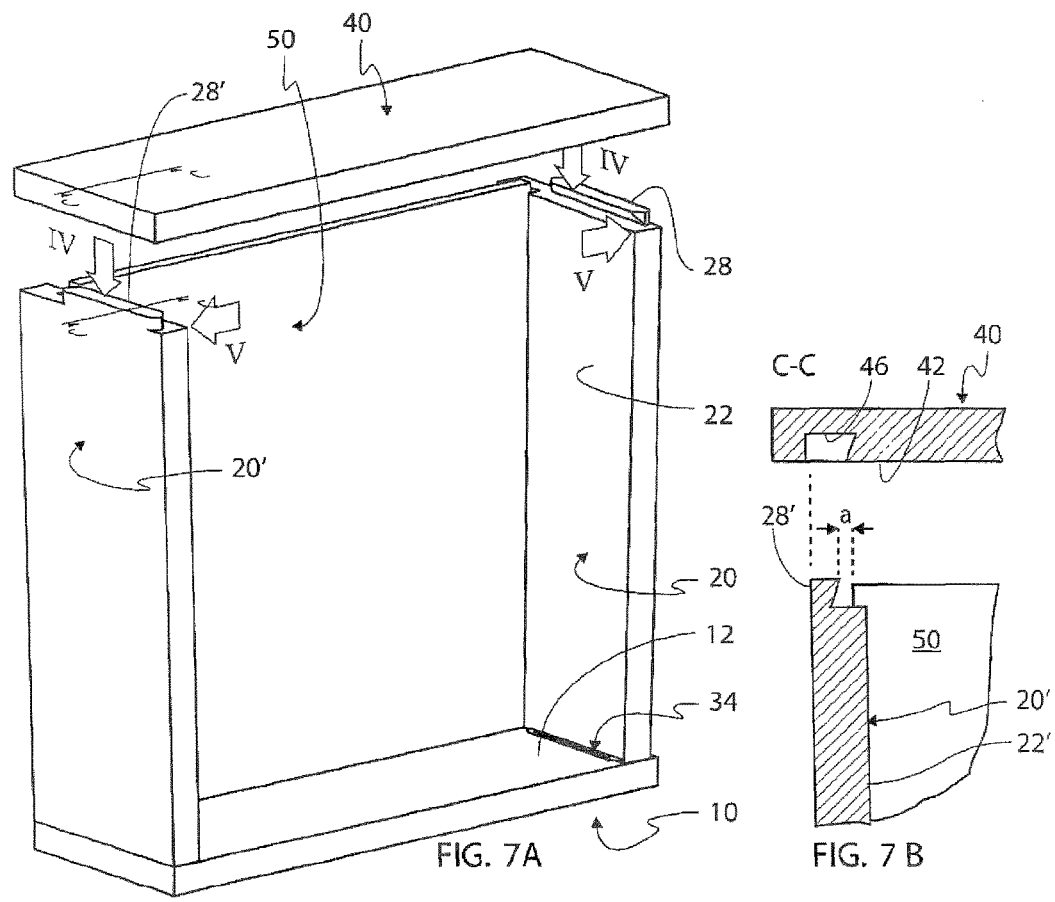
FIG. 7A
FIG. 7B

ASSEMBLING OF DRAWER

CROSS-REFERENCE TO RELATED APPLICATION

This application is a national phase filing, under 35 U.S.C. §371(c), of International Application No. PCT/EP2012/059684, filed on May 24, 2012, the disclosure of which is hereby incorporated by reference in its entirety.

FEDERALLY SPONSORED RESEARCH OR DEVELOPMENT

Not Applicable

BACKGROUND

The present invention relates to the assembling of furniture, in particular to the assembling of planar furniture elements oriented at right angles to one another, such as the side walls, the front wall, and the back wall of a drawer.

When a piece of furniture is composed of mechanically joined furniture elements, the furniture elements are often structurally weaker at the joints, at which they may break when the piece of furniture is subjected to loads. This is particularly the case when the furniture elements are manufactured of softer materials, such as particle board, and joined by traditional joints, such as but joints, lap joints, and traditional tongue and groove joints. This problem is particularly pronounced provided the piece of furniture is shipped in non-assembled state, i.e. as individual or separate components such as plate or wall components to be assembled by the consumer. Further, when disassembling a piece of furniture the structure of the individual furniture elements may be damaged, e.g. when removing plugs or nails. This may reduce the structural strength of the piece of furniture as a whole after being assembled again. It is therefore an object of the present invention to improve the structural strength of a piece of furniture that is composed of several furniture elements. If tools are used to assemble a piece of furniture from several furniture elements, this may cause damage to the structure of the furniture elements. For example, the thread of a screw may cause damage if driven too far into the structure of a furniture element. This typically occurs if an electrical screwdriver is used at the wrong torque setting. It is therefore an additional object of the present invention to enable an assembling that does not require tools.

From U.S. Pat. No. 1,468,786, a drawer is known, which is composed of a front member, two side members, a rear end member and a bottom, which are all joint together in conventional dove tail joints.

SUMMARY

The above objects and advantages are according to a first aspect of the present invention achieved by a furniture assembly comprising: a first furniture element defining a first surface and a first groove in the first surface, the first groove defining a first side surface and an opposite second side surface; a second furniture element comprising a first tongue for being received in the first groove, the first tongue defining a first tongue surface and an opposite second tongue surface, the second tongue surface being adapted for facial cooperation with the second side surface of the first groove, the first side surface and the first tongue surface defining a first elongated compartment in said facial cooperation between the second tongue surface and the second side surface; and a first elongated furniture locking element for insertion into the first elongated compartment for engaging the first side surface and the first tongue surface and for forcing the second tongue surface toward the second side surface.

The first groove is here understood to be running parallel to the first surface for defining an elongated space. The specified groove allows for the first elongated furniture locking element to engage a significant area of the first furniture element, which reduces the risk of structural damage to the first furniture element. This allows for the first furniture element to be manufactured from softer furniture materials, such as particle board or chip board. The first tongue may extend along a substantial length of the first groove when inserted into said first groove. This means that the first elongated furniture locking element may engage a significant area of the second furniture element, which allows for the second furniture element to be manufactured from softer furniture materials, such as particle board or chip board.

The second tongue surface may define a first extension and the second side surface may define a cooperating first undercut for preventing a movement of the second furniture element relative to the first furniture element in a direction normal to the first surface of the first furniture element. The second tongue surface and the second side surface may define a first half-dovetail connection extending in the lengthwise direction of the first groove.

The furniture assembly according to the first aspect of the present invention may further comprise: a third furniture element defining a second surface and a second groove in the second surface, the second groove defining a third side surface and an opposite fourth side surface. The second furniture element may further comprise a second tongue for being received in the second groove, the second tongue defining a third tongue surface and an opposite fourth tongue surface, the fourth tongue surface being adapted for facial cooperation with the fourth side surface of the second groove, the third side surface and the third tongue surface defining a second elongated compartment in said facial cooperation between the fourth tongue surface and the fourth side surface. The furniture assembly according to the second aspect of the present invention may further comprise: a second elongated furniture locking element for insertion into the second elongated compartment for engaging the third side surface and the third tongue surface and for forcing the fourth tongue surface toward the fourth side surface.

The second groove is here understood to be running parallel to the second surface for defining an elongated space. The specified groove allows for the second elongated furniture locking element to engage a significant area of the third furniture element, which reduces the risk of structural damage to the third furniture element. This allows for the third furniture element to be manufactured from softer furniture materials, such as particle board or chip board. The second tongue may extend along a substantial length of the second groove when inserted into said second groove. This means that the second elongated furniture locking element may engage a significant area of the second furniture element, which allows for the second furniture element to be manufactured from softer furniture materials, such as particle board or chip board.

The first tongue surface of the first tongue and the third tongue surface of the second tongue may face opposite directions. Additionally or alternatively, the second tongue surface of the first tongue and the fourth tongue surface of the second tongue may face opposite directions. This allows for the second furniture element to be tilted relative to the first furniture element such that the elongated furniture element is pressed against the first side surface of the first groove. The third furniture element may then be positioned such that when tilted back the fourth tongue surface engages the fourth side surface. This allows for a further furniture element to be engaged by the second furniture element when it is tilted back. The elastic material of the elongated base portion may act to force the second furniture element to tilt back when tilted relative to the first furniture element. This has the effect that the contacting of the fourth tongue surface and the fourth side surface may be caused by forces defined by the structure of the furniture assembly alone, which may make the assembly easier.

The second tongue surface may define a second extension and the second side surface may define a cooperating second undercut for preventing a movement of the second furniture element relative to the first furniture element in a direction normal to the first surface of the first furniture element. The second tongue surface and the second side surface may define a first half-dovetail connection extending in the lengthwise direction of the first groove.

The above objects and advantages are according to a second aspect of the present invention achieved by a method for assembling a furniture, the furniture comprising a first furniture element defining a first surface and a first groove in the first surface, the first groove defining a first side surface and an opposite second side surface, a second furniture element comprising a first tongue defining a first tongue surface and an opposite second tongue surface, and a first elongated furniture locking element, the method comprising: (a) inserting the first tongue in the first groove, (b) positioning the second tongue surface in contact with the second side surface of the first groove for establishing a facial cooperation between the second tongue surface and the second side surface, the first side surface and the first tongue surface defining a first elongated compartment; and (c) inserting the first elongated furniture locking element in the first elongated compartment for engaging the first side surface and the first tongue surface and for forcing the second tongue surface toward the second side surface.

The furniture may further comprise a third furniture element defining a second surface and a second groove in the second surface, the second groove defining a third side surface and an opposite fourth side surface, and the second furniture element further comprising a second tongue defining a third tongue surface and an opposite fourth tongue surface, and a second elongated furniture locking element, and the method may further comprise: (d) inserting the second tongue in the second groove, (e) positioning the fourth tongue surface in contact with the fourth side surface of the second groove for establishing a facial cooperation between the fourth tongue surface and the fourth side surface, the third side surface and the third tongue surface defining a second elongated compartment; and (f) inserting the second elongated furniture locking element in the second elongated compartment for engaging the third side surface and the third tongue surface and for forcing the fourth tongue surface toward the fourth side surface.

The first tongue surface of the first tongue and the third tongue surface of the second tongue may face opposite directions. Additionally or alternatively, the second tongue surface of the first tongue and the fourth tongue surface of the second tongue may face opposite directions.

The above objects and advantages are according to a first aspect of the present invention achieved by an elongated furniture locking element comprising: an elongated base portion of an elastic material for insertion into an elongated compartment, the elongated base portion comprising a first side wall and a second side wall running lengthwise and parallel to one another and interconnected by a connection element spacing them apart, and an elongated insertion element for being inserted between and transversal to the first side wall and the second side wall for forcing the first side wall and the second side wall away from each other.

The elastic material has the effect that the first side wall and the second side wall are resilient, which means that they will retain their original shape after being deformed. This has the advantage that the locking element can be reused several times. An example of an elongated compartment into which the elongated base portion may be inserted is the space defined between two planar walls facing each other. The connection element may be of the same material as the first side wall and the second side wall. Forcing is here understood to correspond to the acting of one or more forces This means that if the first side wall and the second side wall are prevented from moving outwards, e.g. by being tightly fitted inside the elongated compartment, the first side wall and the second side wall will deform instead of moving outwards.

The elongated base portion may define an insertion side for being inserted into the elongated compartment and the outer surface of the first side wall. The outer surface of the second side may taper towards the insertion side. Insertion side is here understood to mean the side of the base portion intended to directly face the elongated compartment when inserted therein. If the insertion side is regarded as the bottom side of the elongated base portion, then the tapering towards the insertion side means that the base portion is narrower at its bottom side than at the top side of the elongated base portion.

The first side wall may comprise a first plurality of parallel ridges on its outer surface running transversal to and distributed lengthwise along the first side wall. The first plurality of parallel ridges allows the first side wall of the elastic material to deform also in tight fit inside an elongated compartment, thus giving a secure locking without damaging the walls of the elongated compartment. The running of the first plurality of parallel ridges transversal to the first side wall means that the ridges extend in the same direction as the direction in which the elongated base portion is intended to be inserted into the elongated compartment, which makes the insertion easier. The lengthwise distribution has the effect that the first side wall may deform over a substantial portion of its length, thus allowing a more secure locking.

The first side wall may comprise a second plurality of parallel ridges on its inner surface running transversal to and distributed lengthwise along the first side wall. Each ridge of the second plurality of parallel ridges may have a height that increases towards the insertion side. The second side wall may comprise a third plurality of parallel ridges on its inner surface running transversal to and distributed lengthwise along the first side wall. Each ridge of the third plurality of parallel ridges may have a height that increases towards the insertion side.

The second and third pluralities of parallel ridges allow the first side wall of the elastic material to deform also in tight fit inside an elongated compartment, thus giving a secure locking without damaging the walls of the elongated compartment or the structure of the first side wall and the second side wall. The running of the second and third pluralities of parallel ridges transversal to the first side wall means that the ridges extend in same direction as the the direction in which the elongated insertion element is intended to be inserted into the elongated base portion, which makes the insertion of the elongated insertion element easier. The lengthwise distributions have the effect that the first side wall and the second side wall may deform over a substantial portion of its length, thus allowing a more secure locking. The increasing of the height of each ridge towards the insertion side allows for the elongated base portion to deform more at its insertion side, which generally gives a more secure locking.

The connection element may comprise: an elongated bottom portion of the elastic material and running lengthwise along and interconnecting the first side wall and the second side wall.

The bottom portion may be shorter than the first side wall and the second side wall for defining a through-going aperture at the insertion side. The connection element may define a first end and an opposite second end. The connection element may comprise: a first end portion of the elastic material positioned at the first end and interconnecting the first side portion and the second side portion; and the connection element may further comprise: a second end portion of the elastic material positioned at the second end and interconnecting the first side portion and the second side portion.

The first end portion and the second end portion may define a first flat surface portion and a second flat surface portion, respectively. The first flat surface portion and the second flat surface portion may be flush with the outer surface of the second side wall. The outer surface of the second side wall may be planar. The flush relationship allows for a tight fitting in an elongated compartment partly defined by a planar surface of a tongue inserted in a groove. The first end portion and the second end portion may define a first curved surface portion and a second curved surface portion, respectively. The first curved surface portion and the second curved surface portion may face the same side of the elongated base portion as the first side wall. The first curved surface portion and the second curved surface portion flush relationship allows for a tight fitting in an elongated compartment partly defined by a groove formed by milling or countersink drilling.

The elastic material may be rubber, e.g. an elastomer that can undergo elastic deformation under stress or compression and return to its previous size and form without permanent deformation.

The elongated insertion element may be composed of an inelastic material. The inelastic material may be plastic.

The elongated insertion element may comprise an elongated splice portion having a cuboid shape for filling a substantial portion of the space between the first side wall and the second side wall. This allows for a tight fitting of the furniture locking element inside an elongated compartment defining parallel side surfaces. The elongated insertion element may comprise a grip for manually gripping and pulling the insertion element from the elongated base portion when the elongated insertion element is inserted between the first side wall and the second side wall. The grip may comprise an elongated grip portion oriented parallel to and positioned at one end of the elongated splice portion, the elongated grip portion may be thinner than the elongated insertion element. The grip may comprise a hook, ridge, or indenture for being engaged by a fingernail. These features allow for the elongated furniture locking element to be easily removed when fitted.

The insertion element may comprise a support portion for being positioned between the first side wall and the second side wall and for being supported relative to the elongated base portion, and the elongated splice portion being pivotally connected to the support portion. This allows for the whole of the insertion element to be easily and correctly inserted between the first side wall and the second side wall. The support portion may comprise a flange for engaging a portion of the outer surface of the elongated bottom portion. This allows for a secure support of the insertion element, since the flange may be sandwiched between the bottom portion and the bottom of an elongated compartment.

The first side wall, the second side wall, and the elongated insertion element may define a planar surface of the elongated furniture locking element when the elongated insertion portion is inserted between the first side wall and the second side wall.

The first elongated furniture locking element in the first aspect of the present invention may be an elongated furniture locking element according to the third aspect of the present invention. The second elongated furniture locking element in the first aspect of the present invention may be an elongated furniture locking element according to the third aspect of the present invention.

The furniture in the second aspect of the present invention may comprise any of the features of the elongated furniture locking element according to the third aspect of the present invention. The furniture according to the first aspect of the present invention may comprise any of the features of the furniture assembly according to the second aspect of the present invention.

The furniture assembly according to the first aspect of the present invention may be adapted to be used in the method according to the second aspect of the present invention. The elongated furniture locking element according to the third aspect of the present invention may be adapted to be used in the furniture assembly according to the first aspect of the present invention and/or in the method according to the second aspect of the present invention.

BRIEF DESCRIPTION OF THE DRAWINGS

The present invention is now to be further described with reference to the drawings in which FIG. 6A is a perspective and schematic view similar to the view of FIG. 5 illustrating the proper position of the bottom plate wall received in the grooves of the side walls and also in a groove of the rear wall, FIG. 6B is a sectional view along the line C-C in FIG. 6A illustrating the position of the bottom plate wall relative to the left-hand side wall of the drawer also shown in FIG. 6A, FIG. 7A is a perspective and schematic view similar to the view of FIG. 6A illustrating a step of joining a front wall to the left-hand and right-hand side walls also shown in FIG. 6A by pushing the side walls aside for allowing swallow joints of the side walls to be received within cooperating grooves of the front wall, FIG. 7B is a sectional view along the line C-C of FIG. 7A illustrating the positioning of the left-hand side wall relative to the front wall for joining the side wall to the front wall.

DETAILED DESCRIPTION

Figure 1A:
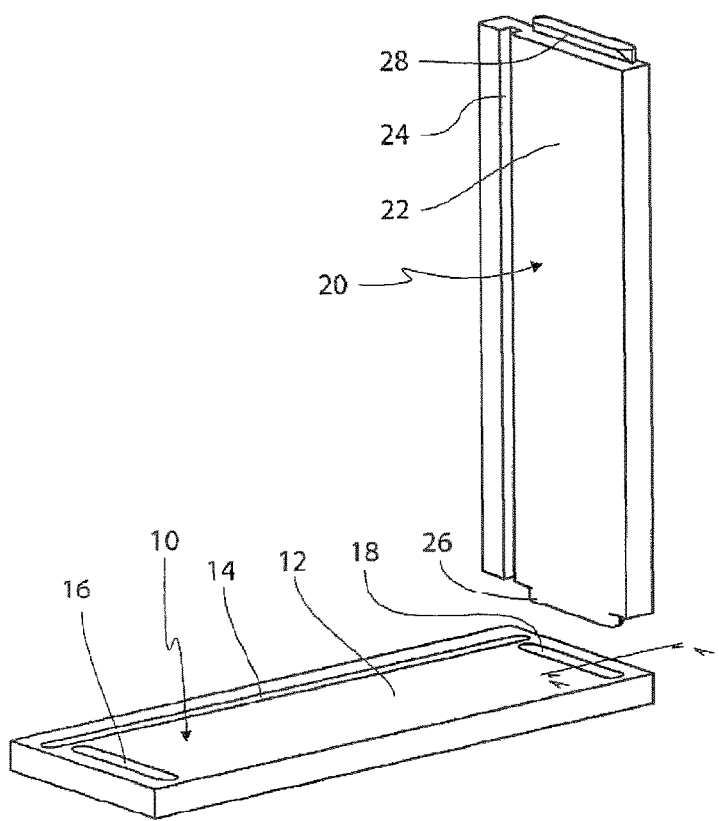
FIG. 1A is a perspective and schematic view of a first step of joining a side wall to a rear wall for assembling a drawer in accordance with the teachings of the present invention.

In the drawings, a technique of assembling a piece of furniture, more precisely a drawer, is described involving the assembling of two side walls, a rear wall, a front wall and a bottom plate wall by using particularly configured dovetails and a locking element characteristic of the present invention. The technique is as such, as said above, described in relation to the assembling of a drawer, however, it is contemplated that a person having ordinary skill in the art will readily understand how to equivalently use the technique when assembling differently configured pieces of furniture such as tables, closets, sofas, beds, chairs etc. or for instance kitchen furniture.

In FIG. 1A, the reference numeral 10 designates the rear wall of the drawer to be assembled as described above, which rear wall defines an inwardly facing side 12 in which a transversal groove 14 is provided and also two transverse side grooves 16 and 18.

In FIG. 1A, one of the above-mentioned side walls is further shown designated the reference numeral 20. The side wall 20 defines an inwardly facing side 22 in which a transversal groove 24 is provided which groove resembles the groove 14 of the rear wall 12 and serves the same purpose as the groove 14 as will be evident from the below description. The side wall 20 further has two tongues 26 and 28 extending from opposite ends of the side wall 20 and differing from one another in the orientation of the dovetail configuration of the two tongues. The tongue 26 has its side coextending with the inwardly facing side 22 of the side wall 20 whereas the tongue 28 has its corresponding one side coextending with the side of the side wall 20 opposite to the side wall 22 shown in FIG. 1A.

Figure 1B:
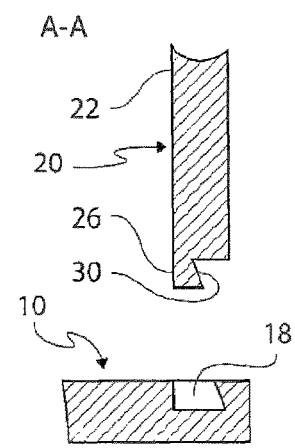
FIG. 1B is a sectional view along the line A-A in FIG. 1A.

In FIG. 1B, a sectional view along the line A-A in FIG. 1A is shown illustrating the configuration of the groove 18 and also the configuration of the tongue 26. As is evident from FIG. 1B, the tongue 26 has as already said above its one side coextending with the inwardly facing side 22 of the side wall 20 and has its opposite dovetail side 30 configured so as to allow the dovetail configured side to match with a similarly configured dovetail inner side of the groove 18. As is evident from FIG. 1B, the width of the groove 18, however, is far larger than the width of the tongue 26 allowing the tongue 26 to be easily received within the groove 28 and then shifted to the right in order to bring the dovetail configured side 30 of the tongue 26 into facial contact with the similarly configured dovetail side of the groove 18.

Figure 2A:
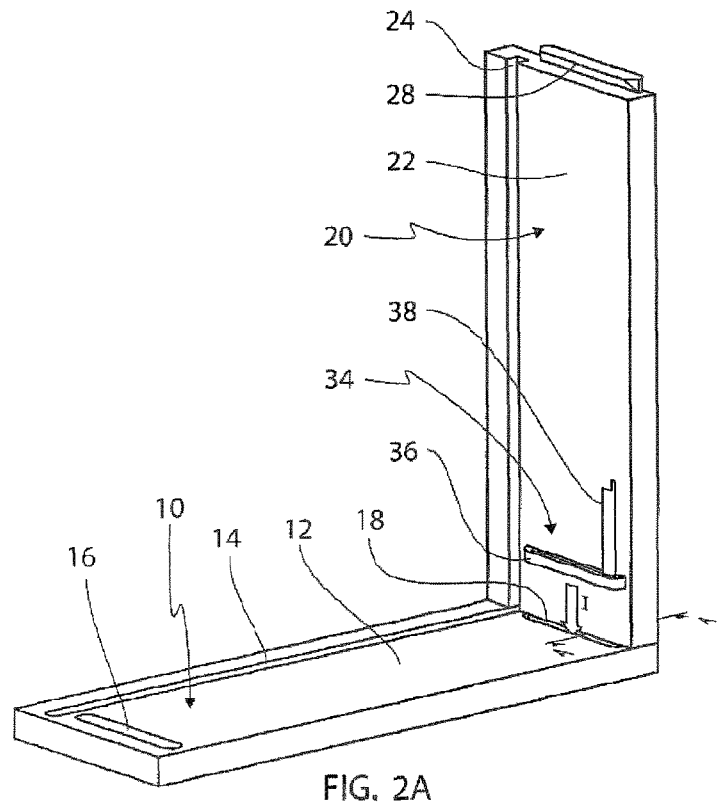
FIG. 2A is a perspective and schematic view similar to the view of FIG. 1A illustrating the side wall joined to the rear wall and a further step of mounting a locking element in the rear wall.
Figure 2B:
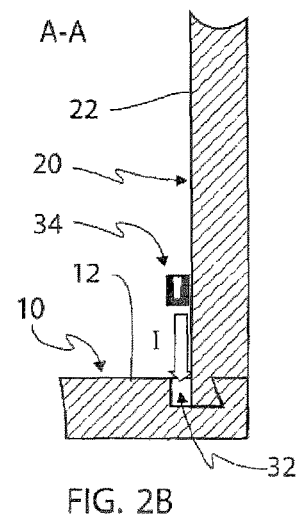
FIG. 2B is a sectional view similar to the view of FIG. 1B along the line A-A in FIG. 2A.

In FIG. 2A, a further step of assembling the side wall 20 and the rear wall 10 is shown in which step, the tongue 26 of the side wall 20 is received within the groove 18 of the rear wall 10. Similarly in FIG. 2B, a sectional view along the line A-A of FIG. 2A is shown illustrating the close positioning of the dovetail side of the tongue 26 relative to the identical configured side of the groove 18 leaving open a small compartment 32 between the planar side of the tongue 26 coextensive with the inwardly facing side 22 of the side wall 20 and the adjacent side of the groove 18. In the compartment 32, a locking element 34 is introduced as indicated by an arrow I in FIG. 2A which locking element is composed of two parts, a fairly soft rubber part constituting a trough-shaped part 36 and a fairly stiff part 38, which locking element 34 is to be described in greater detail below with a reference to FIGS. 10A, 10B and 10C.

Figure 3A:
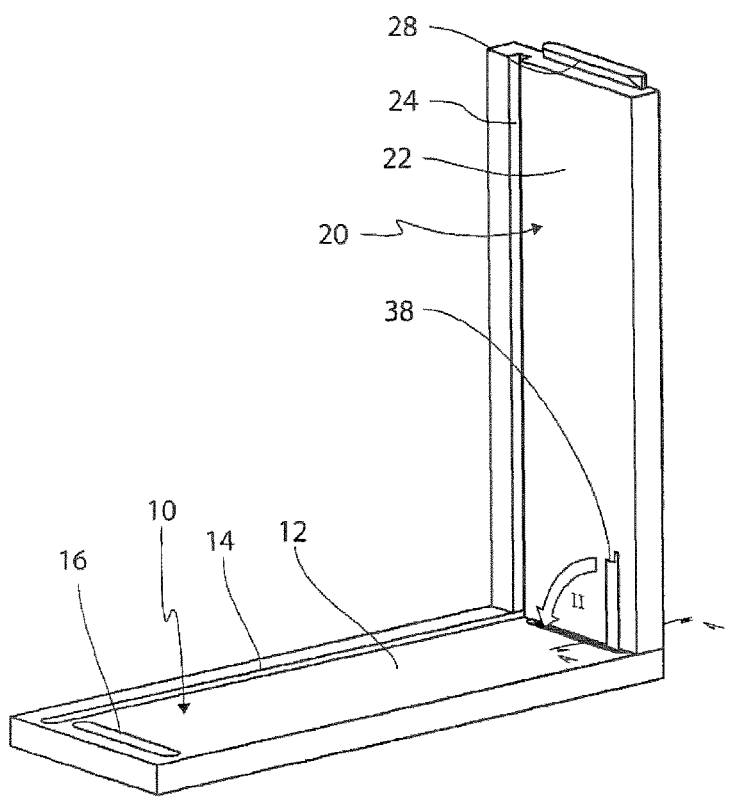
FIG. 3A is a perspective and schematic view similar to the views of FIGS. 1A and 2A illustrating a further step of sealing the locking element in its intentional position in the rear wall.
Figure 3B:
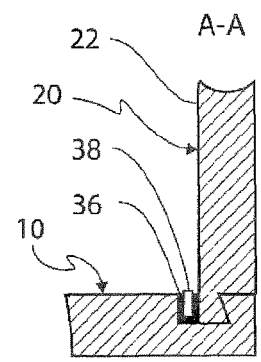
FIG. 3B is a sectional view similar to the views of FIGS. 1B and 2B along the line A-A in FIG. 3A.

In FIG. 3A, a further step of assembling the side wall 20 and the rear wall 10 is shown, in which step the stiff part 38 of the locking element 34 is turned down into the trough of the trough-shaped part 36 as indicated by an arrow II and in doing so expanding the rubber material of the trough-shaped part 36 and thereby locking the side wall 20 relative to the rear wall 10. In FIG. 3B, a sectional view similar to the views 1B and 2B illustrates the fixation of the locking element 34 in the compartment 32 fixating the side wall 20 relative to the rear wall 10.

Figure 4A:
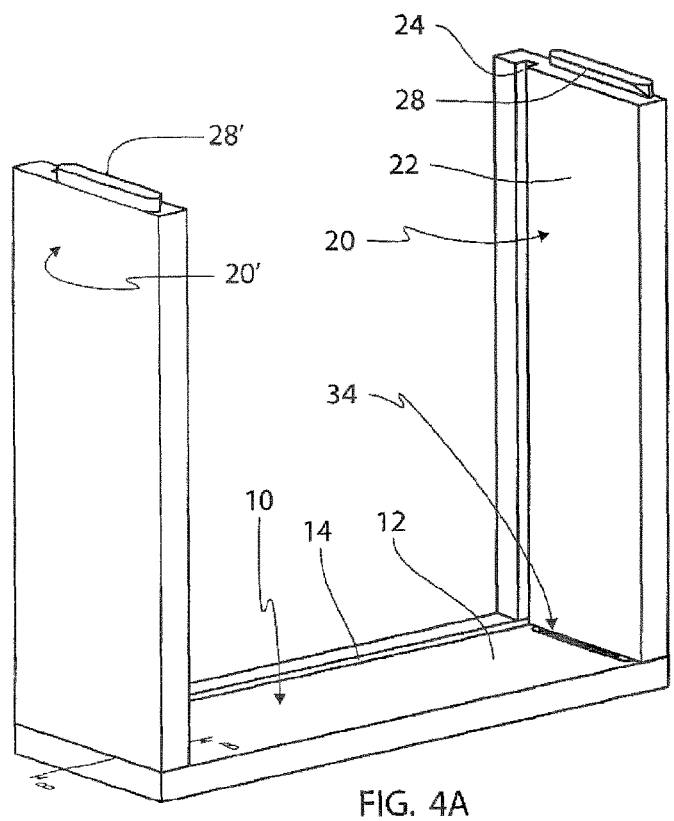
FIG. 4A is a perspective and schematic view illustrating the further assembling of a further side wall to the rear wall of the drawer in steps similar to the steps shown in FIGS. 1A, 2A and 3A.
Figure 4B:
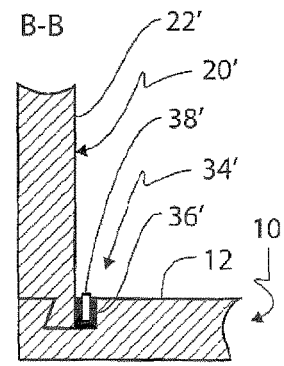
FIG. 4B is a sectional view along the line B-B in FIG. 4A.

In FIG. 4A, a further side wall 20' constituting a mirror image component relative to the side wall 20 is mounted and fixated to the rear wall 10 in a process involving steps similar to the steps described above with reference to FIGS. 1A, 2A and 3A in relation to the mounting and fixating of the side wall 20 relative to the rear wall 10. The mirror image side wall 20' is fixated relative to the rear wall 10 in the same manner as the fixating of the side wall 20 relative to the rear wall 10, i.e. by means of a further locking element 34' similar to the locking element 34 as shown in FIG. 4B as the fixating of the locking element is accomplished by turning the stiff part 38' of the locking element 34' in the opposite direction as compared to the orientation shown by the arrow indicated by II in FIG. 3A.

Throughout the present specification, components and elements identical to previously described elements are designated the same reference numerals as described previously whereas components or elements serving the same purpose as a previously described component or element, respectively, however differing in geometry from the previously described element is designated the same integer, however, added a marking for identifying the geometrical difference. Due to the functional correspondence between the previously described component or element and the component or element, respectively, having a different geometrical configuration, no specific description is given except for the difference between the previously described component or element and the geometrically differing component or element.

Figure 5:
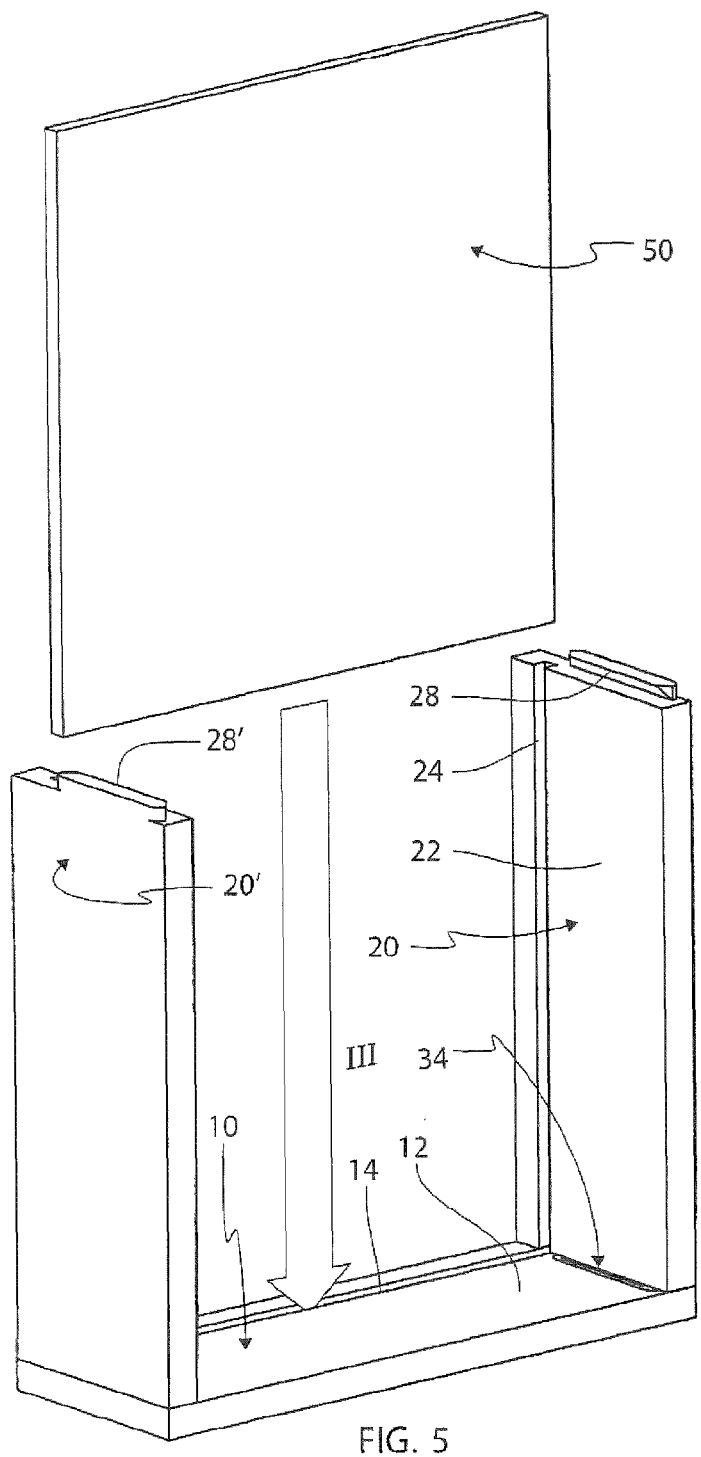
FIG. 5 is a perspective and schematic view similar to the view of FIG. 4A illustrating a further step of sliding a bottom plate along grooves machined in the inner sides of the side walls also shown in FIG. 4A.

In FIG. 5, a bottom plate wall 50 is to be mounted in the assembly of the rear wall 10 and the two oppositely positioned side walls 20 and 20' as the bottom plate wall 50 is moved downwardly, indicated by an arrow III, as the edges of the bottom plate wall 50 is received within the oppositely positioned and parallel grooves 24 and 24' of the side walls 20 and 20', respectively.

In FIG. 6A, the final position of the bottom plate wall 50 received within the side walls 20 and 20' and the rear wall is shown, as the lowermost edge of the bottom plate wall shown in FIG. 5 and FIG. 6A is received within the groove 40 of the rear wall 10.

In FIG. 6B, the position of the bottom plate wall 50 relative to the mirror image side wall 20' is shown in a sectional view along the line C-C in FIG. 6A illustrating the positioning of the upper leftmost corner of the bottom plate wall 50 relative to the dovetail inner side of the tongue 28' of the mirror image side wall 20'.

In FIG. 7A, the front wall 40 is to be assembled to the bottom plate wall 50 and the side walls 20 and 20'. The front wall 40 is, as is evident from FIGS. 8A and 9A, somewhat broader than the rear wall 10 and is like the rear wall 10 provided with a groove for receiving the uppermost edge part of the bottom plate wall 50 and is further provided with two grooves one of which is shown in FIG. 7B which illustrates a sectional view of the upper left-hand part of FIG. 7A illustrating the front wall 40 and the mirror image side wall 20'. Like the rear wall 10, the grooves of the front wall 40 provided in the inwardly facing side 42 of the front wall are somewhat broader than the tongue to be introduced into the groove allowing the dovetail tongue, i.e. the tongue 28' shown in FIG. 7A and FIG. 7B, to be received within the groove designated the reference numeral 46, however, as is evident from FIG. 7B, and as described above, the tongue 28' has its one side coextending with the outer side of the mirror image side wall 20' and has its dovetail side facing inwardly, for allowing the tongue 28' to be introduced into the cooperating groove 46 of the inwardly facing side 42 of the front wall 40, the mirror image side wall 20' and similarly the side wall 20, as the front wall 40 is moved downwardly as indicated by arrows IV, and swung outwardly or tilted outwardly as indicated by arrows V and is illustrated in FIG. 7B, in which the dovetail end of the tongue 28' is slightly shifted a distance designated 'a' from the upper leftmost corner of the bottom plate wall 50 thereby allowing the tongue 28' to be introduced into and received within the groove 46.

Figure 8A:
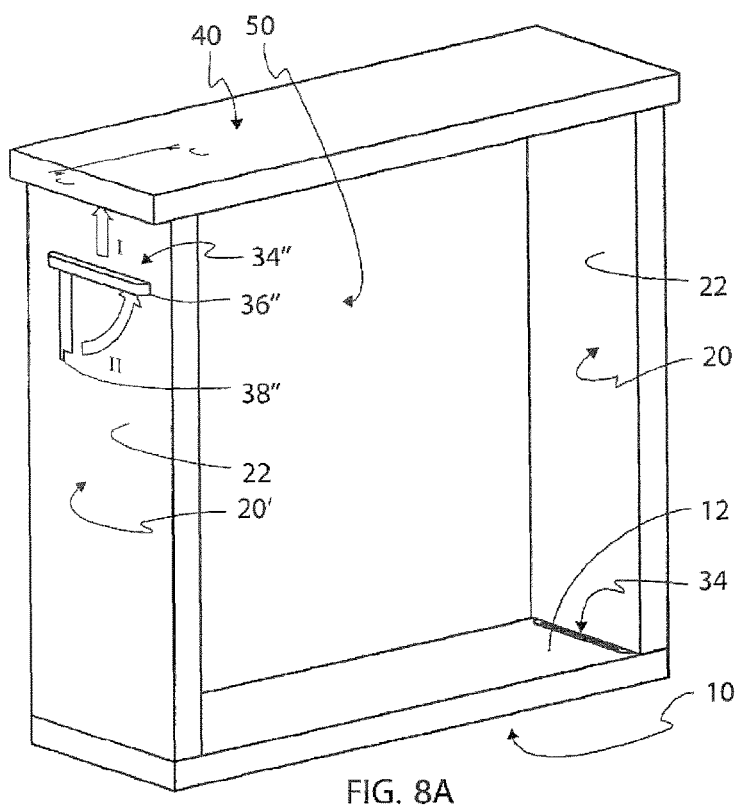
FIG. 8A illustrates a step similar to the step shown in FIG. 2A of positioning a locking element similar to the locking element shown in FIG. 2A at the outside of the left-hand side wall of the drawer for fixating the left-hand side wall relative to the front wall of the final drawer.
Figure 8B:
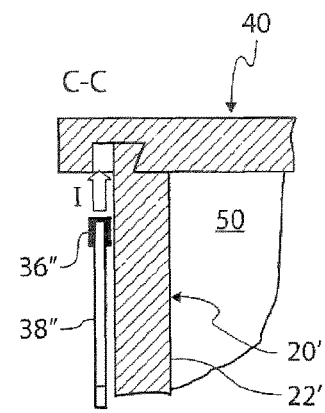
FIG. 8B is a detailed cross-sectional view taken along line C-C of FIG. 8A.
Figure 9A:
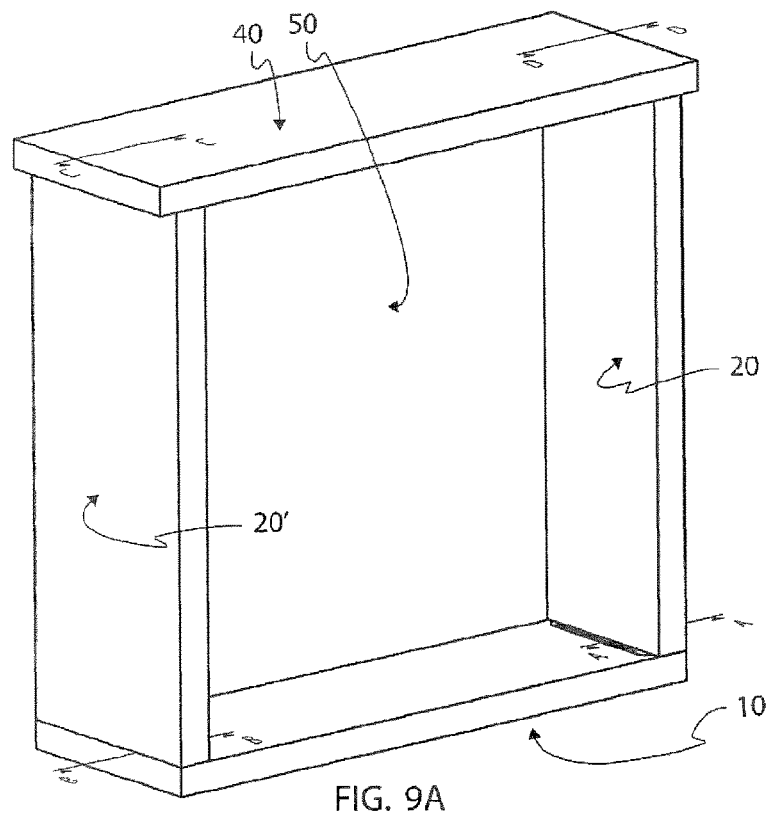
FIG. 9A is a perspective and schematic view similar to the view of FIG. 8A illustrating the final drawer, FIG. 9B are sectional views along the line C-C, D-D, B-B and A-A of the final drawer shown in FIG. 9A illustrating the locking of the side walls to the rear wall and the front wall.
Figure 9B:
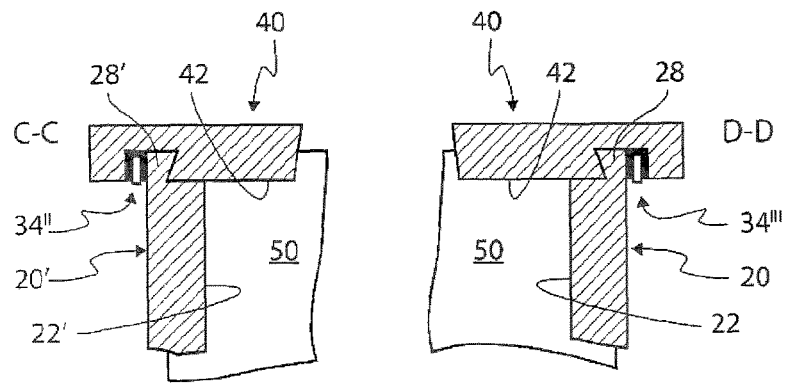
Figure 9B:
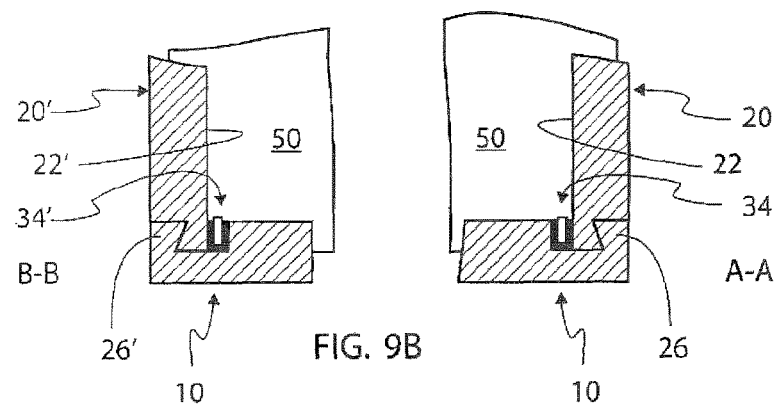

In FIG. 8A, the tongues 28 and 28' of the side wall 20 and the mirror image side wall 20', respectively, are received and positioned in their intentional position having the dovetail side of the tongues facing the dovetail side of the respective grooves as is illustrated in FIG. 8B which is a sectional view along the line C-C of FIG. 8A. Similar to the locking of the rearmost ends of the side walls 20 and 20' as described above with reference to FIGS. 2A and 2B, the front most ends of the side walls 20 and 20' are locked in position by means of two additional locking elements, one of which is shown in FIG. 8A and designated the reference numeral 34" as the locking element 34" like the above-described locking elements 34 and 34' is introduced in a two-step operation as indicated by the arrows I and II. It is, however, to be understood as is illustrated in FIGS. 9A and 9B, that the rearmost and front most ends of the side walls 20 and 20' differ from one another in order to allow the dovetail fixation to be established between the front most ends of the side walls 20 and 20' and the front wall 40 as the bottom plate wall 50 is received at the inwardly facing sides of the side walls 20 and 20', i.e. in the grooves 24 and 24', respectively, shown in FIG. 5. The mirror image configuration of the tongues 26 and 28 of the side wall 20 and similarly the tongues 26' and 28' of the mirror image side wall 20' is mandatory for allowing the simple assembling of the drawer by receiving the bottom plate wall 50 within the assembly of the two side walls 20 and 20' and the rear wall 10 prior to fixating the front wall 40 to the fixation tongues of the front wall 40.

An alternative embodiment of the above fixation system in which the fixation tongues 26 and 28 are shifted relative to one another and at the same time modifying the dovetail shaped grooves of the rear wall and the front wall is obviously within the scope of the present invention.

In FIG. 9A, the assembled drawer is shown and in FIG. 9B, sectional views along the lines A-A, B-B, C-C and D-D of FIG. 9A are shown illustrating the mirror image configuration of the tongues 26, 28 and 26', 28' of the side walls 20, 20, repsectively.

Figure 10B:
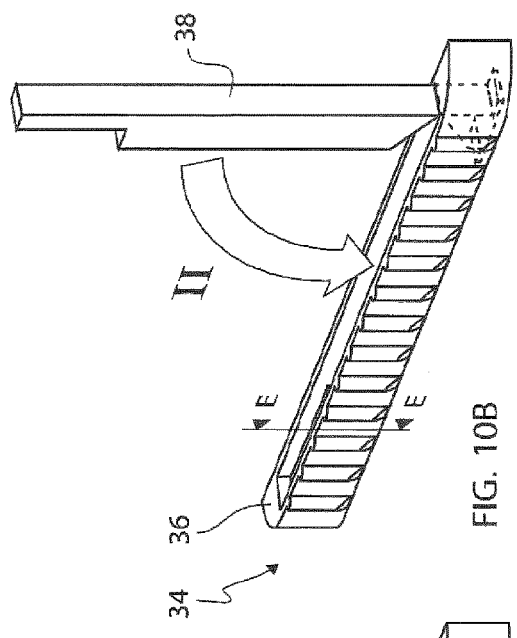
FIG. 10B is a perspective and schematic view similar to the view of FIG. 10A illustrating the locking element after assembling the two parts of the locking element also shown in FIG. 10A, and further illustrating a sectional view along the line E-E illustrating schematically the expansion of the open trough-shaped part when forcing the fairly stiff expander part into the open though of the open trough-shaped part.
Figure 10C:
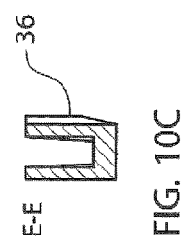
FIG. 10C is a cross-sectional view taken along line E-E of FIG. 10B.
Figure 10A:
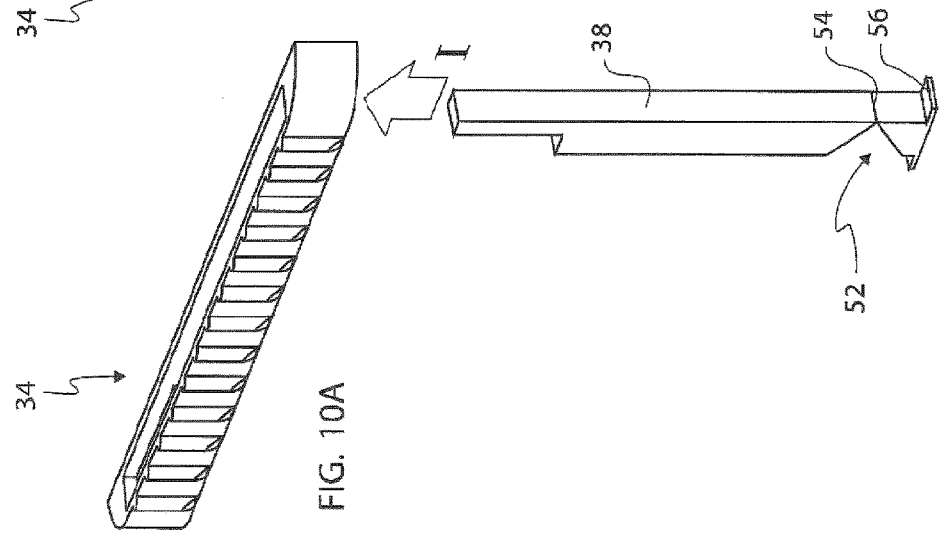
FIG. 10A is a perspective and schematic view illustrating the locking element also shown in FIGS. 2A and 8A and composed of an open trough-shaped part made from a fairly soft rubber material and a bendable fairly stiff expander part.

In FIGS. 10A, 10B and 10C, the locking element 34 composed of the fairly soft rubber part 36 and the stiff part 38 is shown in greater detail. As is evident from FIGS. 10A and 10B, the end parts of the trough-shaped part 36 are rounded for configuring the outer contour of the trough-shaped part 36 to the configuration of the grooves 16, 18 and 46, 48 of the rear wall 10 and the front wall 40, respectively, which grooves are, as will be readily understood by a person having ordinary skill in the art, produced on an NCC milling machine or similar apparatus.

The outer surface of the trough-shaped part 36 to be contacted with the inner side of the groove of the rear wall 10 or the front wall 40 are further corrugated for improving the fixation of the locking element within the cooperating groove but also allowing a slight deformation of the locking element as the side walls 20 and 20' are shifted or swung outwardly as is illustrated in FIG. 7A as indicated by the arrows V.

The trough-shaped part 36 is preferably cast from neoprene rubber whereas the stiff part 38 is cast from nylon or similar fairly stiff and rigid material. As is evident from FIG. 10A, the stiff part 38 is provided with a cut 54 providing a thin web within the material of the stiff part 38 which web provides a film hinge 54 around which the stiff part 38 is bent as is indicated in FIG. 10B by the arrow II. The stiff part 38 is further at its end to be received within the trough-shaped part 36 provided with an end plate for fixating the stiff part 36 in its intentional position prior to bending the freely protruding part of the stiff part into the trough-shaped part 36 causing a sideways expansion of the trough-shaped part. In FIG. 10O, a vertical sectional view of the trough-shaped part 36 is shown.

Figure 11:
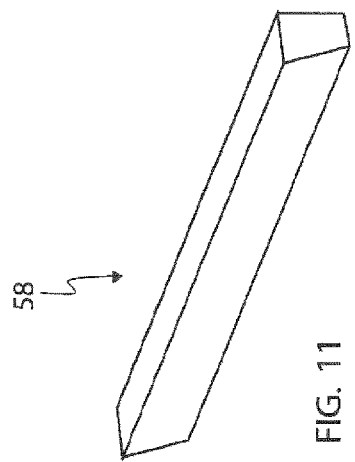
FIG. 11 is a perspective and schematic view of an alternative embodiment of the locking element constituted by a wedged-shaped wooden component.

In FIG. 11, an alternative embodiment of the locking element is shown constituted by a wooden block 58 to be hammered into the compartment defined within one of the grooves 16, 18, 46, 48, preferably in an alternative variant of the above-described assembling technique in which the side walls 20 and 20' are glued to the rear wall 10 and the front wall 40 and at the same time gluing the wooden block 58 into a permanent fixation relative to the rear wall 10 or the front wall 40.

The above-described preferred usage of the locking element 34 apart from a simple assembling of the drawer or similar piece of furniture, also involves the highly advantageous possibility of disassembling the drawer by first removing the locking elements 34" and 34'" shown in FIG. 9B and afterwards removing the front wall 40 and then removing the bottom plate wall 50 and finally disconnecting the side walls 20 and 20' from the rear wall 10 by removing the locking elements 34 and 34' whereupon the rear wall, the front wall, the side walls and the bottom wall together with the four locking elements 34, 34', 34" and 34'" may be put into a planer configuration allowing a shipment of the disassembled drawer for instance by moving from one location to another. Consequently, apart from allowing the drawer to be sent from the manufacturer to the customer, the use of the disassembling technique described above provides the further advantage of allowing the customer to disassemble the drawer at a later stage for shelving the drawer or for moving the drawer from one location to another in the extremely space saving configuration.

Although the present invention has been described above with reference to a specific and today advantageous embodiment constituting a drawer involving a non-permanent or permanent assembling of the drawer, the present invention is obviously not limited to the technique of assembling and possibly disassembling drawers but is also applicable in connection with different pieces of furniture such as closets, tables, chairs, sofas, beds, kitchen furniture etc. such obvious embodiments or modifications are to be considered encompassed by the protective scope as defined in the appending claims.

The invention claimed is:

1. A method for assembling a furniture item that comprises first and second furniture elements, the first furniture element defining a first surface including a groove, the groove being defined between a first side surface and an opposite side surface, the second furniture element including a tongue defining a first tongue surface and an opposite second tongue surface, the method comprising:
   a) inserting the tongue into the groove so as to establish facial contact between the second tongue surface and the second side surface of the groove, the first side surface of the groove and the first tongue surface thereby defining an engagement compartment;
   b) providing a furniture locking element, comprising 1) an elastic base portion configured for insertion into the elongated compartment, the elastic base portion comprising a first side wall and a second side wall interconnected by a connection element spacing the first side wall and the second side wall apart so as to form a trough; and 2) a stiff insertion portion configured for insertion into the trough formed by the elastic base portion;
   c) inserting the elastic base portion of the furniture locking element into the elongated compartment so as to engage the first side surface and the first tongue surface, thereby urging the second tongue surface toward the second side surface; and
   d) inserting the stiff insertion portion of the furniture locking element into the trough formed in the elastic base portion of the furniture locking element, thereby forcing the first side wall and the second side wall away from each other and locking the second tongue surface against the second side surface,
   wherein the stiff insertion portion of the furniture locking element comprises an elongated splice portion having a cuboid shape and defining a longitudinal axis, the elongated splice portion being configured for filling a substantial portion of a space defined between the first side wall and the second side wall, and the stiff insertion portion further comprises a support portion configured for being positioned between the first side wall and the second side wall and for being supported relative to the elastic base portion, and wherein the elongated splice portion is pivotally connected to the support portion at a pivot axis by a film hinge defined by a web of material such that the pivot axis is transverse to the longitudinal axis of the elongated splice portion.

2. The method of claim 1, wherein the connection element of the elastic base portion of the furniture locking element comprises a bottom portion of an elastic material extending lengthwise along and interconnecting the first side wall and the second side wall.

3. The method of claim 1, wherein the connection element of the elastic base portion of the furniture locking element defines a first end and an opposite second end, and wherein the connection element comprises:
   a first end portion of an elastic material and positioned at the first end and interconnecting the first side wall and the second side wall; and
   a second end portion of an elastic material and positioned at the second end and interconnecting the first side wall and the second side wall.

4. The method of claim 1, wherein the elastic base portion comprises neoprene rubber.

5. The method of claim 1, wherein the stiff insertion portion comprises nylon.

* * * * *